May 7, 1963   L. FERRIS   3,088,421
COFFEE TABLE
Filed Aug. 7, 1961
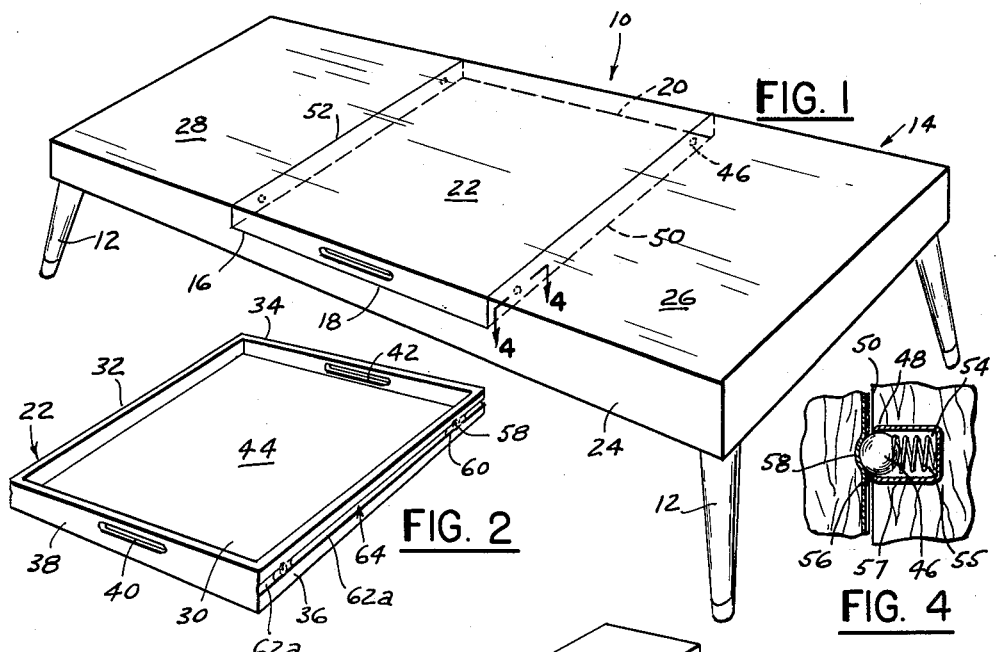
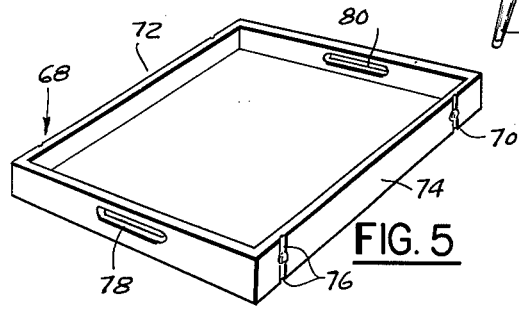
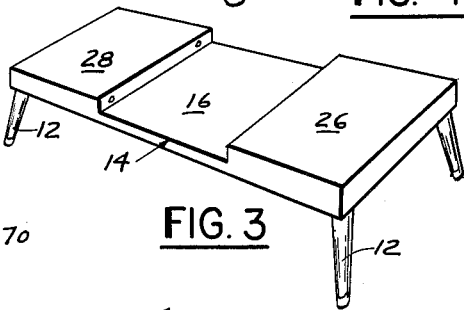
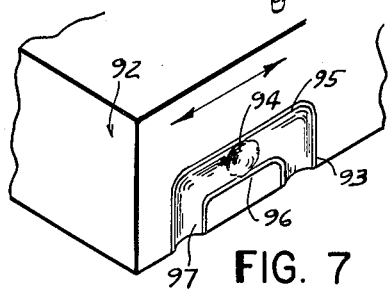
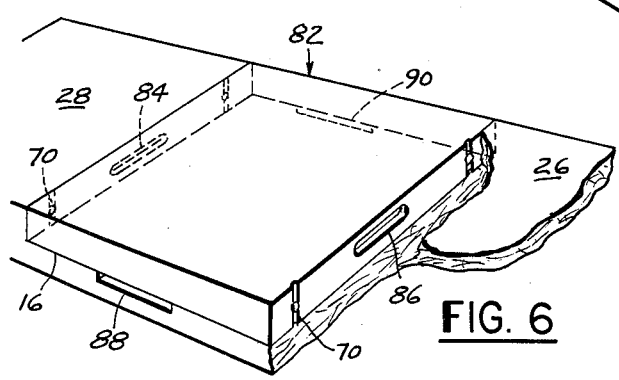
INVENTOR.
LESTER FERRIS
BY Hane and Nydick
ATTORNEYS

United States Patent Office 3,088,421
Patented May 7, 1963

3,088,421
COFFEE TABLE
Lester Ferris, 2119 E. 17th St., Brooklyn, N.Y.
Filed Aug. 7, 1961, Ser. No. 129,612
4 Claims. (Cl. 108—13)

This invention relates to tables, and more particularly, to a serving table, such as a coffee table.

For the most part, serving tables such as coffee tables have become purely occasional furniture and are used merely as a support for objects placed thereon or as a support from which food, beverages, and the like, are dispensed.

One disadvantage of such tables is the need to bring food and beverages to the table by hand, and often several trips are required, since the table itself is usually too large to be carried to the kitchen; and then, again, these tables are often very decorative pieces of furniture and there is great reluctance to carry them about for fear of damaging them. Additionally, if food or beverages are carried by means of a tray to the table in a dining area, the tray generally has to be dispensed with, and usually if people are being entertained in the living room, the tray has to be returned to the kitchen to avoid damaging other furniture and to retain the decorum of the room.

Accordingly, in reality, the serving table or coffee table is a device of limited utility aside from its decorative function as a piece of furniture.

The present invention provides a serving table which retains its utility as a piece of furniture, but which also extends its usefulness for purposes of supporting objects and dispensing refreshments. Thus, the serving table of the invention overcomes the disadvantages and limited utility of the ordinary serving table.

To this end, the serving table is provided with a channel which is adapted to receive a removable section in either of two positions and securing means are provided for holding the section in place in the serving table in both positions.

The removable section is formed as a container and is intended to serve as a carrying tray for bringing food and beverages to the serving table or as a serving tray for dispensing such things to persons directly. Additionally, the removable section can be reinserted into the serving table and retained in position therein as a container for more permanent objects normally associated with a serving table, such as a plant, a cigarette lighter, a container for cigarettes and the like, or the section with its contents is reinsertable into the channel and carried by the table from which table refreshments can be served.

However, when the removable section is not so used, or after it has been used in the aforementioned manner, the section is insertable into the channel in another position wherein it fills the channel and conforms to the overall configuration of the table. For this purpose, the outer surface of the section is finished and decorated to match the body of the serving table.

These and other objects will be understood more fully from the following detailed description when taken in conjunction with the following drawings, wherein:

FIG. 1 is an isometric drawing of a serving table with a removable section inserted in a channel therein showing the table when the section is not utilized as a serving tray or container;

FIG. 2 is an isometric drawing of the removable section with its base in a downward-facing position forming a serving tray;

FIG. 3 is an isometric drawing of the table with the removable section removed therefrom;

FIG. 4 is a front-elevational view, in part, of a horizontal surface of the table illustrating securing means for holding the removable section in place therein; and FIGS. 5, 6 and 7 are isometric drawings of modifications of the removable section.

Referring to FIGS. 1–4, there is shown an exemplary embodiment of the serving table 10 of the invention. A plurality of legs 12 are secured to a horizontal surface 14 in a customary manner for supporting the surface.

A channel 16 is provided between two opposing sides 18 and 20 of the horizontal surface 14 to receive a removable section 22 therein. While the horizontal surface 14 can be a single piece of material, such as a high grade wood, the horizontal surface may be made more economically by utilizing a horizontal section 24 of a less costly wood, such as plywood, pine, or the like, and the portions 26 and 28 thereof adjacent the channel 16 can be thinner layers of more costly woods, such as walnut, mahogany, and the like.

In the interest of having a decorative piece of furniture, the less costly wood can be stained and otherwise finished so as to match the more costly wood.

The removable section 22 includes a base 30 and four side members 32–38 secured thereto. Depending on the dimensions of the channel 16 in the horizontal surface 14, the removable section 22 can be square or rectangular.

Preferably, the height of the section 22 is selected to have the base 30 thereof lie in the same plane and flush with the adjacent portions 26 and 28 of the horizontal surface 14 when the section 22 is carried in the channel 16 with the base 30 in an upward-facing position. The width of the section 22 is selected to have the opposing sides 34, 38 thereof lie in the same plane and flush with the ends of the portions 26 and 28 so that the section 22 fills the channel 16 and gives the appearance of being a part of the horizontal surface 14.

Finger-gripping slots 40 and 42 are provided in the opposing sides 34, 38 of the section 22 for removing the section from the channel 16, carrying the section 22 as a serving tray, and to facilitate reinserting the section 22 in the channel.

When the removable section 22 is held in the table 10 with the base 30 in a downward-facing position, the section forms a container in the table 10 from which objects carried thereon can be dispensed. Thus, the section 22 is adapted to be removed from the table 10 and used as a serving tray for bringing things to the table, and adapted to be reinserted into the channel 16 for dispensing from the table.

Whereas the outer surface of the section 22 preferably conforms to the overall finish of the table 10, the inner surface thereof has a substantially inert or non-stainable finish 44 which can be cleansed and which will not be stained by contact with food, beverages, or the like.

Spring-loaded bearings 46 of conventional design are secured in place in sockets 48 therefor, and the sockets 48 are secured in turn to the opposing ends 50 and 52 of the portions 26 and 28, respectively, of the horizontal surface. A socket 48 is shown in FIG. 4 and consists of a metal part having a central opening 54 therein which receives a spring 55 and a bearing 46 therein. A raised surface 56 is provided for securing the spring-loaded bearing in the opening 54 in place so that the bearing 46 is movable in and out of the opening 54 but not laterally.

A portion 57 of the opposing ends 50 and 52 are cut away to receive each of the sockets 48 so that only the bearings 46 protrude into the channel 16. In this manner, the removable section 22 can be made to fit snugly in the channel 16 and the overall appearance of the table is improved.

Female receptacles 58 are secured to opposing sides 32, 36 of the removable section 22 and spaced from one another to receive the bearings 46 therein for holding the section 22 in place in the channel 16. A horizontal groove 60 is provided in each of the female receptacles 58 adjacent to the opening and a horizontal groove 62a is provided centrally in each of the sides 32 and 36 between the female receptacles 58 secured thereto and between each of the receptacles and the ends of said sides to provide a horizontal channel 64 for the bearings 46. Thus, the removable section 22 is slidable in and out of the channel 16 along a plane transverse to the horizontal surface 14. Additionally, by providing the grooves 60 and 62 the bearings 46 do not mar the finish of the sides of the removable section when the section 22 is removed and reinserted in the channel 16.

In the exemplary embodiment shown in FIG. 5, the removable section 68 is adapted to be lifted out of the channel 16 and to be reinserted therein as opposing to being moved laterally in and out of the channel 16.

For this purpose, and to preserve the decorative finish of the section 68, female receptacles 70, secured to opposite sides 72 and 74, are provided with vertical grooves 76 adjacent the opening therein which extend to the ends of said sides, respectively. Thus, by grasping the finger-gripping slots 78 and 80 and lifting upwards, the section 22 can be removed from the channel 16, and by threading the bearings 46 in the grooves 76, the section 22 can be reinserted into the channel 16 with only slight downward movement.

In the exemplary embodiment shown in FIG. 6, the removable section 82 is adapted to be carried in the table 10 and removable therefrom in accordance with either of the arrangements shown in FIGS. 2 and 5, the arrangement of FIG. 5 being shown, but the section 82 is carried in the channel 16 with opposing finger-gripping slots 84 and 86 concealed so as to improve the appearance of the table.

Therefore, the section 82 is positionable in the channel 16 with the slots 84 and 86 adjacent to the ends of the portions 26 and 28; and slots 88 and 90 are provided in the channel 16, underneath the section 82 for grasping the bottom of the section 82 in order to facilitate the removal of the section 74.

The removable section 92, shown in part in FIG. 7, is adapted to be carried and removed from the horizontal section 14 as set forth previously, but in this exemplary embodiment the section is removable from the channel 16 without the use of finger-gripping slots therein or slots in the channel as in FIG. 6 so that the overall appearance of the table is improved.

As in the previous embodiments, a female receptacle 93 is secured to each of the ends of the sides of the section 92 to accept spring-loaded bearings therein. The receptacle 93 is formed from a metal plate having an opening 94 intermediate of two spaced-apart ridges 95 and 96, which define a U-shaped groove 97. Accordingly, the section 92 is slidable transversely to the horizontal section 14 in both directions for disengaging the bearing 46 from the opening 94 so that the section 92 can be lifted upward and out of the channel 16. Conversely, the section 92 is reinsertable into the channel 16 by tilting the section slightly to thread the bearings into one of the two legs of the grooves 97 and the section is slidable transversely to snap the bearings into the openings. Instead of carrying the section 92 by means of finger-gripping slots, the section can be carried as a tray by grasping the sides of the section.

Accordingly, in operation, each of the removable sections 22, 68, 82, and 92 are adapted to be carried in the channel 16 with the bases thereof in either a downward-facing or upward-facing position, and are removable and reinsertable into the channel. Thus, when the bases are in an upward-facing position, the channel is filled and the horizontal surface 14 appears as a solid body; and when the bases are downward-facing, the sections serve as a removable container, which can be used as a serving tray.

Having described several exemplary embodiments of the invention, I desire the scope of the invention be determined by the appended claims, and not be limited by those embodiments as modifications will suggest themselves to persons skilled in the art without departing from the principles of the invention.

What is claimed is:

1. A coffee table or the like for use as a serving table and as a decorative piece of furniture, said table comprising a solid integrated member having a horizontal surface to form a table top, a plurality of supporting legs therefor, said member having a channel therein extending between a pair of opposite sides thereof, a container having a base and a plurality of said members, said container being adapted to be received in said channel and to be completely removed therefrom, spring loaded rollers secured in the sides of said channel, receptacles in opposing side members of said container for receiving said spring loaded rollers to hold the container firmly in place in the channel, said receptacles being provided with grooves for the spring loaded rollers so that said rollers do not mar the finish of the sides of the container as the container is slid laterally in and out of the channel, said spring loaded rollers and said receptacles being located such that the container is receivable in said channel in a plurality of positions, in one position the container is receivable in said channel and secured therein with the base of the container facing downward so that container is in an upright position, in another position said container is receivable in said channel and secured therein with the base of the container facing upwardly so that said container covers said channel in said horizontal surface.

2. A coffee table or the like for use as a serving table and as a decorative piece of furniture, said table comprising a member having a horizontal surface, a plurality of supporting legs therefor, said member having a channel therein extending between a pair of opposite sides thereof, a container having a base and a plurality of side members, said container being adapted to be received in said channel and to be completely removed therefrom, spring loaded holding means secured to said member at the sides of said channel, receptacles in opposing side members of said container for receiving said spring loaded holding means to hold the container in place in the channel, said receptacles being provided with grooves extending generally vertically when the container is in place in the channel, said grooves serving to prevent the spring loaded holding means from marring the finish of the container as the container is lifted in and out of the channel, said holding means and said receptacles being mounted at equal distances from the ends of said channel so that the container may be placed in said channel in one of two positions, in one position the container is in an upright position with the base facing downwardly, in another position the base of the container faces upwardly so that said container covers the channel in the first said member.

3. A coffee table or the like for use as a serving table and as a decorative piece of furniture, said table comprising a solid integrated member having a generally flat horizontal surface forming a table top, a plurality of supporting legs extending downwardly from said member, said member having a channel therein extending between a pair of opposite sides thereof, a container having a base and a plurality of upright walls extending from said base thereby to define a serving tray, said container being adapted to be received in said channel and to be completely removed therefrom, spring-loaded holding means secured to said member at the sides of said channel, said spring-loaded holding means protruding into said channel when the container is removed from said channel, receptacles in opposing side walls of said container for receiving said spring-loaded holding means to hold the container in place in the channel, said receptacles being provided with grooves extending generally horizontally when the container is in place in the channel, said grooves receiving said protruding spring-loaded holding means and serving to prevent the spring-loaded holding means from marring the finish of the container as the container is slid in and out of the channel, said receptacles and said spring-loaded holding means being mounted at equal distances from the top and bottom of said side walls and the sides of said channel, respectively, so that the container may be placed in said channel in one of two positions, in one position the container being in an upright position with the base facing downwardly, in the other position the base of the container facing upwardly so that said container covers the channel in said first member.

4. A coffee table or the like for use as a serving table and as a decorative piece of furniture, said table comprising a horizontal surface, a plurality of supporting legs therefor, said surface having a channel therein extending between a pair of opposite sides thereof, a section including a base and a plurality of side members forming a generally hollow open container, said section being receivable in said channel and completely removable therefrom, means secured to at least one of said side members and to an adjacent side of said horizontal surface for removably holding said section in place in said table in a plurality of positions, in one position said section being receivable in said channel and secured therein with said base facing downwardly and forming a container in said table, in another position said section being receivable in said channel and secured therein with said base facing upwardly and said section covering said channel in said horizontal surface, said means including spring-loaded holding means secured to said surface at the sides of said channel, receptacles in opposing side members of said section for receiving said spring-loaded holding means to hold the section in place in the channel, said receptacles being provided with two parallel generally U-shaped grooves extending generally vertically when the section is in place in the channel and a connecting groove extending generally horizontally when the section is in place in the channel, said generally horizontal groove having an opening for receiving said spring-loaded holding means, said spring-loaded holding means engaging and disengaging said opening in said generally horizontal groove as the section is placed in and removed from, respectively, said channel by a combined horizontal and vertical movement as said spring-loaded holding means pass along and engage said U-shaped grooves.

References Cited in the file of this patent

UNITED STATES PATENTS

| | | |
|---|---|---|
| 83,460 | Carroll | Oct. 27, 1868 |
| 1,300,759 | Nielsen | Apr. 15, 1919 |
| 1,738,429 | Heyman | Dec. 3, 1929 |
| 1,850,420 | Schuldt | Mar. 22, 1932 |
| 1,952,568 | Schapp et al. | Mar. 27, 1934 |
| 2,346,985 | Mercur | Apr. 18, 1944 |
| 2,628,143 | Stickley | Feb. 10, 1953 |
| 2,683,639 | Brenny | July 13, 1954 |
| 2,730,423 | Mock | Jan. 10, 1956 |
| 2,757,996 | Kozelka | Aug. 7, 1956 |
| 2,833,609 | Lawless | May 6, 1958 |
| 2,903,311 | Earhart | Sept. 8, 1959 |

FOREIGN PATENTS

| | | |
|---|---|---|
| 714,837 | Great Britain | Sept. 1, 1954 |